United States Patent
Reyes-Gavilan et al.

(10) Patent No.: US 6,816,655 B2
(45) Date of Patent: Nov. 9, 2004

(54) COPPER AND OPTICAL FIBER CABLE WITH IMPROVED FILLING MATERIAL

(75) Inventors: Jose L. Reyes-Gavilan, Clifton, NJ (US); Frederick T. Lichtenburg, Hartsdale, NY (US)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 73 days.

(21) Appl. No.: 10/282,454

(22) Filed: Oct. 29, 2002

(65) Prior Publication Data

US 2003/0142932 A1 Jul. 31, 2003

Related U.S. Application Data

(60) Provisional application No. 60/334,855, filed on Oct. 31, 2001.

(51) Int. Cl.[7] .................................................. G02B 6/44
(52) U.S. Cl. ....................... 385/100; 385/109; 174/116; 523/173
(58) Field of Search ................................ 385/100–114; 174/23 C, 25 C, 116, 121 A, 140 C; 523/173

(56) References Cited

U.S. PATENT DOCUMENTS

| | | | |
|---|---|---|---|
| 3,255,136 A | 6/1966 | Hecker et al. ................. 260/23 |
| 4,105,619 A | 8/1978 | Kaufman et al. ........... 260/33.6 |
| 4,187,212 A * | 2/1980 | Zinke et al. ................. 524/101 |
| 4,701,016 A | 10/1987 | Gartside, III et al. .... 350/96.23 |
| 4,757,100 A | 7/1988 | Wichelhaus et al. ........ 523/173 |
| 5,187,763 A * | 2/1993 | Tu .............................. 385/100 |
| 5,276,757 A | 1/1994 | Levy et al. .................. 385/109 |
| 5,728,754 A | 3/1998 | Lakshmanan et al. ...... 523/173 |
| 5,905,833 A | 5/1999 | Sheu ........................... 385/109 |
| 6,080,929 A * | 6/2000 | Fagouri et al. ............ 174/23 C |
| 6,160,939 A | 12/2000 | Sheu ........................... 385/109 |
| 6,374,023 B1 * | 4/2002 | Parris ......................... 385/109 |
| 6,376,584 B1 * | 4/2002 | Galbo et al. ................ 524/102 |

* cited by examiner

Primary Examiner—Brian Healy
Assistant Examiner—Daniel Petkovsek
(74) Attorney, Agent, or Firm—Tyler A. Stevenson

(57) ABSTRACT

A copper and optical fiber filling material that comprises a hydrocarbon component, which is semisolid at use temperatures in combination with an antioxidant system comprising of (a) sulfur containing primary phenolic antioxidant; (b) a mixture of mono- and di-alkyl butyl/octyl diphenylamine; (c) an organic phosphite or phosphonite and (d) optionally one or more hindered phenol antioxidants exhibits excellent oxidative stability.

20 Claims, No Drawings

COPPER AND OPTICAL FIBER CABLE WITH IMPROVED FILLING MATERIAL

This application claims benefit of Provisional application 60/334,855, filed Oct. 31, 2001.

This invention relates to copper and optical fiber cables having a filling material within their core, and more particularly to a filling material that exhibits excellent thermal oxidative stability. More particularly, this invention relates to copper and optical fiber cables having a core in which a composition of matter, which is grease-like and exhibits excellent thermal oxidative stability fills interstices in the core.

BACKGROUND OF THE INVENTION

In the cable industry, it is well known that changes in ambient conditions lead to differences in water vapor pressure between the inside and the outside of a plastic cable jacket. This generally operates to diffuse moisture in a unidirectional manner from the outside of the cable to the inside of the cable. Eventually, this will lead to an undesirably high moisture level inside the cable, especially if a plastic jacket is the only barrier to the ingress of the moisture. High levels of condensed moisture inside a cable sheath system may have a detrimental effect on the transmission characteristics of a metallic conductor cable.

Furthermore, water may enter the cable because of damage to the cable, which compromises its integrity. For example, rodent attacks or mechanical impacts may cause openings in the sheath system of the cable to occur, allowing water to enter, and, if not controlled, to move longitudinally along the cable into splice closures.

Copper and optical fiber cables have made great inroads into the communications cable market. Although the presence of water itself within a copper and optical fiber cable is not necessarily detrimental to its performance, passage of the water along the cable interior to connection points or terminals or associated equipment inside closures, for example, may cause problems especially in freezing environments and should be prevented.

Consequently, it should be no surprise that cables for transmitting communications signals must meet industry standards with respect to waterblocking provisions. For example, one industry standard requires that there be no transmission of water under a pressure head of one meter in one hour through a one-meter length of cable.

Waterblocking materials have been used to fill cable cores and to coat portions of cable sheath systems to prevent the movement longitudinally thereof of any water which enters the cable. Although the use of such a material, which typically is referred to as a filling material and which typically is in the form of a grease-like composition of matter, causes housekeeping problems for field personnel during splicing operations, for example, it continues to be used to prevent entry of the water into the core. In copper and optical fiber cables, a further important function of a filling material is the maintenance of the copper and optical fibers in a low stress state.

A grease-like composition of matter typically is a semisolid or semi liquid substance comprising a thickening or gelling agent in a liquid carrier. The gelling agents used in greases frequently are fatty acid soaps, but high melting point materials, such as clays, silica, organic dyes, aromatic amides, and urea derivatives also are used. Nonsoap thickeners are typically present as relatively isometric colloidal particles. All types of gelling agents form a network structure in which capillary forces hold the carrier.

When a low stress is applied to a grease-like material, the material acts substantially as a solid. If the stress is above a critical value, then the material flows and the viscosity decreases rapidly. The decrease in viscosity is largely reversible because it is typically caused by the rupture of network junctions between the filler particles, and these junctions can reform following the release of the critical stress.

A cable filling material, especially a copper and optical fiber cable filling material, should meet a variety of requirements. Among them is the requirement that the physical properties of the cable remain within acceptable limits over a rather wide temperature range e.g., from about −40.degree. to about 76.degree. C. It is desirable that the composition of matter of the filling material be substantially free of syneresis, i.e. have an ability to retain uniform consistency, over the temperature range. Generally, syneresis is controlled by assuring dispersion of an adequate amount of colloidal particles or other gelling agent.

Of particular importance, is the thermal oxidation resistance of the grease-like compositions in order to maintain the foregoing physical characteristics to meet the requirements set forth above.

U.S. Pat. No. 6,160,939 discloses an optical cable having a filling material with stable viscosity and yield stress wherein the filling material comprises 80–95 wt % of synthetic oils; 5–20 wt % of a diblock copolymer and less than 1.5 wt % of an inorganic gelling agent; and 1–2 wt % of a high molecular weight hindered phenolic antioxidant. An acceptable antioxidant is stated to be Irganox 1035 available from Ciba Specialty Chemicals Corporation, preferably 0.3 wt % of Irganox 1035 antioxidant is used in combination with 1.7 wt % of Irganox 1076 antioxidant, the latter constituent being used to prevent the antioxidant from settling out. Alternatively, 2 wt % of Irganox 1076 antioxidant or Irganox 1520 antioxidant is suitable and available from Ciba Specialty Chemicals Corporation. Irganox is a registered trademark of Ciba Specialty Chemicals Corporation. U.S. Pat. No. 5,905,833 discloses these antioxidants for use in a similar cable filling material.

U.S. Pat. No. 4,701,016 discloses a thixotropic grease composition for cable applications wherein Irganox 1010 antioxidant is employed in the examples in an amount of 0.2 pbw.

U.S. Pat. No. 5,276,757 teaches that any thermal oxidative stabilizer that is capable of functioning as a thermal oxidative stabilizer in the instant filling compositions is suitable so long as it is no more than monofunctional with respect to participation in hydrogen bonding with the fumed silica in the fumed silica network. The preferred thermal oxidative stabilizer is Irganox 1076. The data in Tables 1 and 2 therein suggest that Irganox 1035 results in crosslinking producing negative impacts on both the critical yield stress and the oil separation of optical fiber cable filling compositions.

U.S. Pat. No. 5,728,754 discloses that antioxidant and antioxidant mixtures can be used in the filling materials, which are usually the primary hindered phenol type including various derivatives of phenols, used either solely or in combination with phosphite or thioesters. A mixture of Wingstay SN-1 and Wingstay L-1 is used in the examples.

U.S. Pat. No. 4,105,619 discloses that antioxidants normally used with polyolefin cable fillers are also useful in the cable filling composition and include organic phosphates, phenols, thiodipropionate, BHT; BHA and the like. Preferred is a mixture of thiodipropionate ester, an organic polyhydric phenol and an organic phosphate disclosed in U.S. Pat. No. 3,255,136 and sold under the trademark Mark 2047 of Witco Chemical Corporation.

U.S. Pat. No. 4,757,100 discloses a cable filling composition wherein all the examples contain up to 25 wt % antioxidants, i.e. mixtures of Irganox 1035, 1010 and 1024 with triphenylphosphine.

Surprisingly, it has been found that the combination of (a) sulfur containing primary phenolic antioxidant; (b) a mixture of mono- and di-alkyl butyl/octyl diphenylamine; (c) an organic phosphite or phosphonite and (d) optionally one or more hindered phenol antioxidants is especially effective towards providing oxidative stability for the filling material for copper and optical fiber cables.

DETAILED DESCRIPTION

The copper and optical fiber filling material comprises a hydrocarbon component, which is semisolid at use temperatures in combination with an antioxidant system comprising of (a) sulfur containing primary phenolic antioxidant; (b) a mixture of mono- and di-alkyl butyl/octyl diphenylamine; (c) an organic phosphite or phosphonite and (d) optionally one or more hindered phenol antioxidants is especially effective towards providing oxidative stability for the filling material for copper and optical fiber cables.

The hydrocarbon component is present in the range of about 85 to about 99.8 percent by weight. The hydrocarbon component includes petrolatum; petrolatum/polyolefin wax mixtures; oil modified thermoplastic rubber (ETPR or extended thermoplastic rubber); paraffin oil; naphthenic oil; mineral oil; the aforementioned oils thickened with a residual oil, petrolatum, or wax; polyethylene wax; mineral oil/rubber block copolymer mixture; lubricating grease; and various mixtures thereof, all of which meet industrial requirements similar to those described above.

Alternatively, a hydrocarbon component which is a relatively high molecular weight aliphatic hydrocarbon, the molecular weight of which is at least about 600 as described in U.S. Pat. No. 5,187,763 can be utilized. The aliphatic hydrocarbon constituent may be a synthetic oil such as polyalphaolefin, for example, or a relatively high molecular weight mineral oil. Relatively low pour point oils are used in order to improve copper and optical loss at low temperatures. A thickening system which includes an inorganic constituent and a block copolymer is used to reduce the viscosity of the filling material as well as to reduce oil separation. Incorporating a block copolymer into the filler material allows a reduction of the amount of colloidal particles that has been added to the mixture to prevent syneresis of the gel. This reduction can result in cost savings. Furthermore, it makes possible the formulation of less bleeding compositions having a very low critical yield stress.

The sulfur containing primary phenolic antioxidant is an ester of di(lower)alkylhydroxphenyl alkanoic acid containing a heteroatom as described in U.S. Pat. No. 3,441,575, which is hereby incorporated in its entirety by reference. A specific example is thiodiethylene bis[3-(3,5-di-tert-butyl-4-hydroxyphenyl)propionate] sold under the mark IRGANOX® 1039 from Ciba Specialty Chemicals Corporation.

The mixture of mono- and di-alkyl butyl/octyl diphenylamine is a liquid produced by alkylating diphenylamine with a molar excess of diisobutylene as described in U.S. Pat. No. 4,824,601, which is hereby incorporated in its entirety by reference. A specific example is a mixture of mono- and dialkyl butyl/octyl diphenylamine sold under the mark IRGANOX® L57 from Ciba Specialty Chemicals Corporation.

The phosphites of component (c) are for example those described in U.S. Pat. No. 4,187,212, which is hereby incorporated by reference. Additional phosphites and phosphonites of component (c) are for example selected from triphenyl phosphite, diphenyl alkyl phosphites, phenyl dialkyl phosphites, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyldibenzo[d,f][1,3,2]dioxaphosphepin, 6-fluoro-2,4, 8,10-tetra-tert-butyl-12-methyldibenzo[d,g][1,3,2] dioxaphosphocin, bis(2,4-di-tert-butyl-6-methylphenyl) methyl phosphite, bis(2,4-di-tert-butyl-6-methylphenyl) ethyl phosphite, 2,2',2"-nitrilo[triethyltris(3,3',5,5'-tetra-tert-butyl-1,1'-biphenyl-2,2'-diyl)phosphite], 2-ethylhexyl(3,3', 5,5'-tetra-tert-butyl-1,1'-biphenyl-2,2'-diyl)phosphite and mixtures thereof.

For example, the phosphites and phosphonites of component (c) are selected from tris(2,4-di-tert-butylphenyl)) phosphite (Irgafos®168, Ciba Specialty Chemicals Corp.), tris(nonylphenyl)) phosphite,

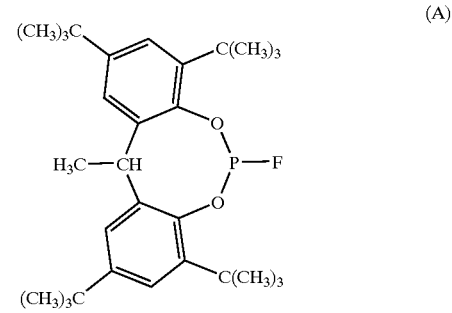

(A)

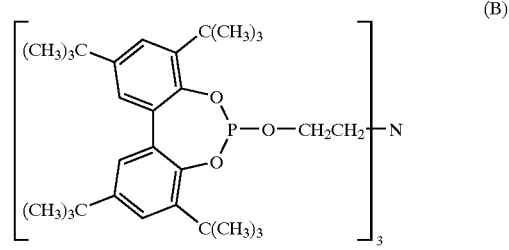

(B)

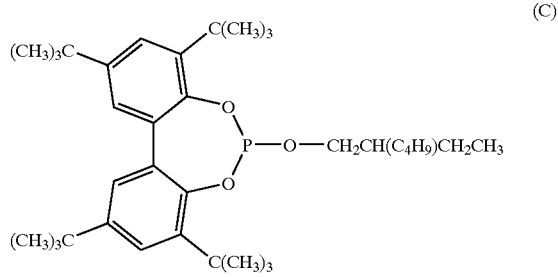

(C)

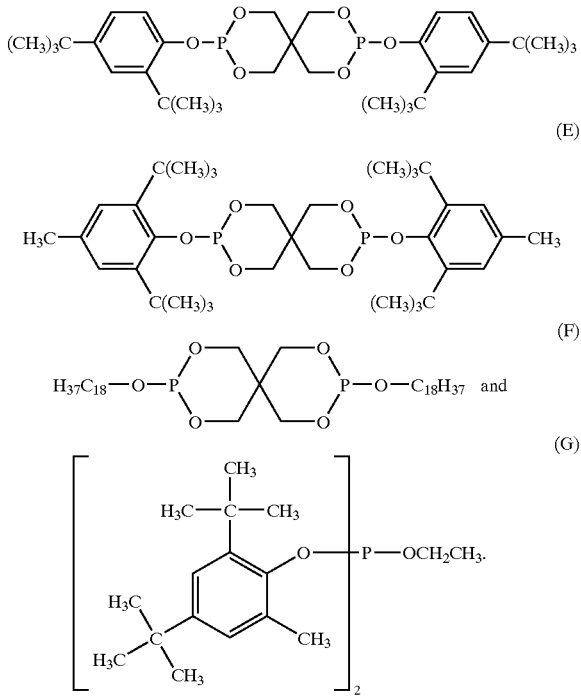

The hindered phenol antioxidants of component (d) include those disclosed in U.S. Pat. No. 3,644,482, which is hereby incorporated by reference. A specific example is pentaerythritol tetrakis(3-(3,5-di-tert-butyl-4-hydroxyphenyl)propionate available from Ciba Specialty Chemicals Corporation under the trademark IRGANOX® 1010.

Additionally, optional component (d) is for example selected from the hindered phenols of 1.1–1.17 and mixtures thereof below.

1.1. Alkylated monophenols, for example 2,6-di-tert-butyl-4-methylphenol, 2-tert-butyl-4,6-di-methylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphehol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1-methylundec-1-yl)phenol, 2,4-dimethyl-6-(1-methylheptadec-1-yl)phenol, 2,4-dimethyl-6-(1-methyltridec-1-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl)adipate.

1.4. Tocopherols, for example α-tocopherol, β-tocopherol, γ-tocopherol, δ-tocopherol and mixtures thereof (Vitamin E).

1.5. Hydroxylated thiodinhenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis(2,6-dimethyl-4-hydroxyphenyl)disultide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α_z-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl)-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3-tert-butyl-4-hydroxyphenyl)butyrate], bis(3-tert-butyl-4-hydroxy-5-methyl-phenyl)dicyclopentadiene, bis[2-(3'tert-butyl-2-hydroxy-5-methylbenzyt)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl-4-hydroxy-2-methylphenyl)pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)) isocyanurate.

1.11. Benzylphosphonates, for example dimethyl-2,5-di-tert-butyl-4-hydroxybenzylphosphonate, diethyl-3,5-di-tertbutyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethyihexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or polyhydric alcohols, e.g. with methanol, ethanol, n-octanol, l-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl) trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1 supplied by Uniroyal).

The antioxidant system is used in an amount of 0.04 to 4.0 weight percent based upon the total filler composition. Component (a) is present in an amount of about 0.005 to about 1.0 wt %; component (b) is present in an amount of about 0.02 to about 1.0 wt %; component (c) is present in an amount of about 0.01 to about 1.0 wt % and component (d) it present can be used in an amount of about 0.005 to about 1.0 wt %, each based on the total filler composition.

Components (a), (b) and optional component (d), in combination, are generally employed in excess of component (c). For example, components (a) and (b) and optionally (d) in total, are used in a 1:1 to 3:1 ratio to component (c).

The hydrocarbon component generally requires thickening so that it will not run out of a cable and so that oil separation is reduced. Oil separation or syneresis is a property of a grease-like filling material, which describes the tendency to bleed oil during the lifetime of the filling material. In order to accomplish this, inorganic and organic thickening agents can be included in the composition of the filling material. Colloidal fillers are used as inorganic thickening agents to adjust the yield stress of the composition. Colloidal filler particles in oil gel the oil by bonding surface hydroxyl groups to form a network. Such gels are capable of supporting a load below a critical value of stress. Above this stress level, the network is disrupted, and the material assumes a liquid-like character and flows under stress. Such behavior often is referred to as thixotropic and is desirable to facilitate processing.

Colloidal fillers include colloidal silica, either hydrophilic or hydrophobic. An example of a hydrophobic fumed silica is a polydimethylsiloxane-coated fumed silica from the Cabot Corporation of Tuscola, Ill. under the trade designation Cab-O-Sil TS720. An exemplary hydrophilic colloidal material is fumed silica available form the Cabot Corporation under the designation Cab-O-Sil M-5. Other colloidal fillers that may be useful in the practice of the invention are precipitated silicas and clays such as bentonites, with or without surface treatment.

Oil retention of the filling material may be improved by the addition of one or more organic thickening agents or bleed inhibitors to the composition. Copolymers used as bleed inhibitors are known to reduce the oil separation of a grease-like filling material, and, unlike fumed silica, does not contribute as much to increasing yield stress and viscosity.

The bleed inhibitor may be a block copolymer, a relatively high viscosity semiliquid, sometimes referred to as semisolid, rubber, or other appropriate rubber. Block copolymers and semiliquid rubbers may be referred to collectively as rubber polymers. Among the block copolymers that can be used are those described in U.S. Pat. No. 5,187,763, which is hereby incorporated by reference.

Cable fabrication can be accomplished by heating the cable filling material to a temperature of approximately 100° C. This liquefies the filling compound so that it can be pumped into the multiconductor cable core to fully impregnate the interstices and eliminate all air space. Alternatively, thixotropic cable filling compounds using shear induced flow can be processed at reduced temperatures in the same manner. A cross section of a typical finished grease filled cable transmission core is made up of about 52 percent insulated wire and about 48 percent interstices in terms of the areas of the total cross section. Since the interstices are completely filled with cable filling compound, a filled cable core typically contains about 48 percent by volume of cable filling compound.

The cable filling compound or one or more of its hydrocarbon constituents enter the insulation through absorption from the interstices. Generally, the insulation absorbs about 3 to about 30 weight percent cable filling compound or one or more of its hydrocarbon constituents, in total, based on the weight of polyolefin insulation. A typical absorption is in the range of about 5 to about 25 weight percent based on the weight of polyolefin.

The following examples are included for the purpose of demonstrating the desirable properties of the filler material.

It must be understood that those examples are for the purpose of illustration only and should not be construed as limiting the invention.

EXAMPLE 1

Compositions of filler material are prepared by mixing the components set forth in Table 1. Solubility testing was determined visually, stability at 275° C. was done by placing a 20 g sample of the composition into a glass vial in an oven and monitoring on a regular basis for change in visual properties. The OIT testing was done using DSC scans generated per ASTM D3895 with the following modifications:

1. Temperature: Isothermal runs at 190° C.
2. Oxygen flow: 60 ml/min
3. Aluminum pans Induction times are reported as the mean of duplicate runs as per ASTM D 3895.

TABLE 1

| Formulation | Concentration Wt. % | Stability at 275° C. 7 days | Solubility after overnight exposure 4° C. | Solubility after overnight exposure RT | OIT (minutes) OIT 1 | OIT (minutes) OIT 2 | OIT (minutes) Average |
|---|---|---|---|---|---|---|---|
| Irganox 1035 | 0.1 | Clear | Sol. | Sol. | 25 | 24 | 25 |
| Irganox 1010 | 0.1 | — | Insol. | Insol. | — | — | — |
| Irganox L 150 | 0.1 | Yellow | Sol. | Sol. | 42 | 43 | 43 |
| Irganox L 150/L 180 | 0.05/0.05 | Clear | Sol. | Sol. | 64 | 69 | 67 |
| Irganox L 150/L 180 | 0.025/0.075 | Yellow | Sol. | Sol. | 5 | 8 | 6 |
| Irganox L 150/L 180 | 0.075/0.025 | Yellow | Sol. | Sol. | 80 | 78 | 79 |
| Irganox L 180 | 0.1 | Yellow | Sol. | Sol. | 1 | 1 | 1 |
| Irganox L 64 | 0.1 | Yellow | Sol. | Sol. | 33 | 34 | 34 |
| Irganox L 64/L 180 | 0.05/0.05 | Clear | Sol. | Sol. | 51 | 48 | 50 |

Irganox 1035 is thiodiethylene bis[3-(3,5-di-tert-butyl-4-hydroxyphenyl)propionate]
Irganox 1010 is pentaerythritol tetrakis(3-(3,5-di-tert-butyl-4-hydroxphenyl)propionate
Irganox L57 is a mixture of mono- and dialkyl butyl/octyl diphenylamine
Irganox L64 is a mixture of 80% Irganox L57 and 20% Irganox 1035
Irganox L150 is is a mixture of 70% Irganox L57; 15% Irganox 1035 and 15% Irganox 1010
Irganox L180 is tris(2,4-ditert-butylphenyl)phosphite It is to be understood that the above-described arrangements are simply illustrative of the invention. Other arrangements may be devised by those skilled in the art which will embody the principles of the invention and fall within the spirit and scope thereof.

We claim:

1. A filling material for copper or optical fiber cable comprising a hydrocarbon component and an antioxidant system comprising of (a) sulfur containing primary phenolic antioxidant; (b) a mixture of mono- and di-alkyl butyl/octyl diphenylamine; and (c) an organic phosphite or phosphonite.

2. A filling material according to claim 1 wherein said hydrocarbon component is selected from the group consisting of petrolatum; petrolatum/polyolefin wax mixtures; oil modified thermoplastic rubber (ETPR or extended thermoplastic rubber); paraffin oil; naphthenic oil; mineral oil; and mixtures thereof.

3. A filling material according to claim 1 wherein said antioxidant system is used in an amount of 0.04 to 4.0 weight percent based upon the total composition.

4. A filling material according to claim 1 wherein component (a) is present in an amount of from about 0.005 to about 1.0 wt %.

5. A filling material according to claim 1 wherein component (b) is present in an amount of from about 0.02 to about 1.0 wt %.

6. A filling material according to claim 1 wherein component (c) is present in an amount of from about 0.01 to about 1.0 wt %.

7. A filling material according to claim 1 further comprising one or more hindered phenol antioxidants.

8. A filling material according to claim 7 wherein said hindered phenol antioxidants are present in an amount of from about 0.005 to about 1.0.wt % based upon the total composition.

9. A filling material according to claim 1 wherein components (a) and (b), in combination, are present in an amount in excess of component (c).

10. A filling material according to claim 7 wherein components (a), (b) and (d), in combination, are present in an amount in excess of component (c).

11. A filling material according to claim 1 wherein components (a) and (b), in combination, are present in a 1:1 to 3:1 ratio to component (c).

12. A filling material according to claim 7 wherein components (a), (b) and (d), in combination, are present in a 1:1 to 3:1 ratio to component (c).

13. A filling composition according to claim 1 wherein component (a) is thiodiethylene bis[3-(3,5-di-tert-butyl-4-hydroxyphenyl)propionate].

14. A filling composition according to claim 1 wherein said component (c) is selected from the group consisting of from triphenyl phosphite, diphenyl alkyl phosphites, phenyl dialkyl phosphites, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl)) 4,4'-biphenylene diphosphonite, 6-isooctyloxy-2,4,8,10-tetra-tert-butyldibenzo[d,f][1,3,2]dioxaphosphepin, 6-fluoro-2,4,8,10-tetra-tert-butyl-12-methyldibenzo[d,g][1,3,2]

dioxaphosphocin, bis(2,4-di-tert-butyl-6-methylphenyl) methyl phosphite, bis(2,4-di-tert-butyl-6-methylphenyl) ethyl phosphite, 2,2',2"-nitrilo[triethyltris(3,3',5,5'-tetra-tert-butyl-1,1'-biphenyl-2,2'-diyl)phosphite], 2-ethylhexyl(3,3', 5,5'-tetra-tert-butyl-1,1'-biphenyl-2,2'-diyl)phosphite and mixtures thereof.

15. A filling composition according to claim 1 wherein component (c) is tris(2,4-ditert-butylphenyl)phosphite.

16. A filling material according to claim 7 wherein said hindered phenol antioxidants are selected from the group consisting of alkylated monophenols, alkylthiomethylphenols, hydroquinones, alkylated hydroquinones, tocopherols, hydroxylated thiophenyl ethers, alkylidenebisphenols, O-, N- and S-benzyl compounds, hydroxybenzylated malonates, aromatic hydroxybenzyl compounds, triazine compounds, benzylphosphonates, acylaminophenols, esters of β-(3,5-dicyclohexyl-4-hydroxyphenyl)propionic acid, esters of 3,5-di-tert-butyl-4-hydroxyphenyl acetic acid with mono- or polyhydric alcohols, and amides of β-(3,5-di-tert-butyl-4-hydroxyphenyl)propionic acid.

17. A filling material according to claim 7 wherein said hindered phenol antioxidant is pentaerythritol tetrakis(3-(3, 5-tert-butyl-4-hydroxyphenyl)propionate.

18. A filling material according to claim 1 further comprising a thickening agent.

19. A filling material according to claim 1 further comprising a colloidal filler.

20. An optical fiber cable comprising: a core comprising at least one optical fiber transmission medium; a sheath system which is disposed about said core; and a filling material according to claim 1.

* * * * *